March 13, 1962     F. H. KIERBOW     3,024,826
ANTISKID CHAIN AND ATTACHING MEANS THEREFOR
Filed July 28, 1961
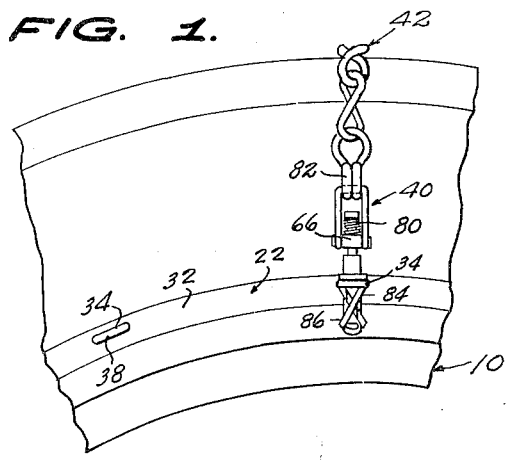
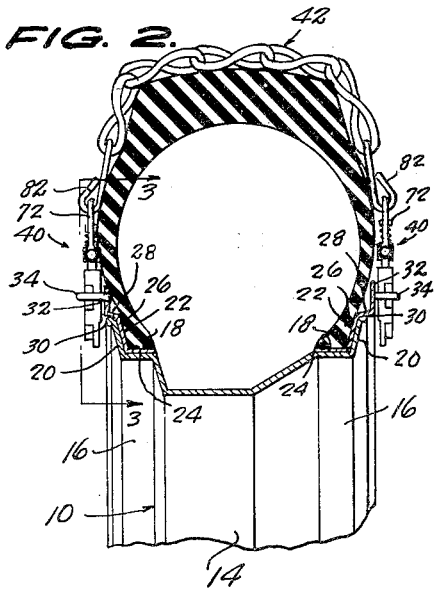
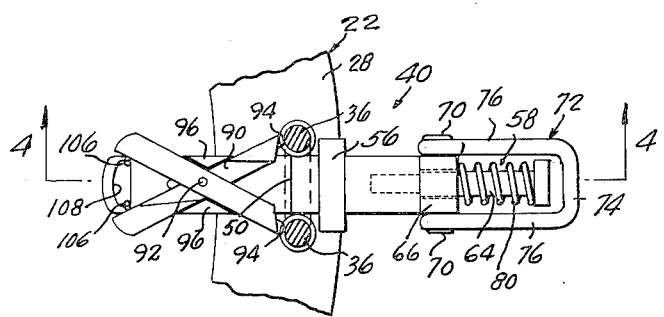
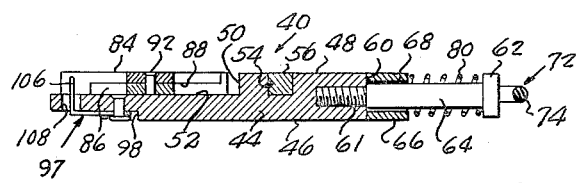
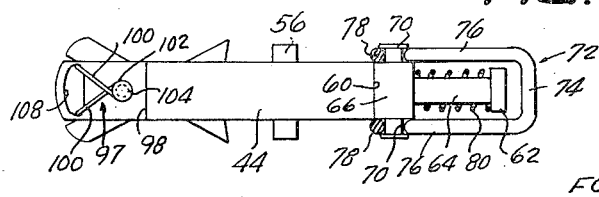
INVENTOR.
FORREST H. KIERBOW,
BY
McMorrow, Berman & Davidson
ATTORNEYS.

United States Patent Office 3,024,826
Patented Mar. 13, 1962

3,024,826
ANTISKID CHAIN AND ATTACHING MEANS THEREFOR
Forrest H. Kierbow, P.O. Box 242, Graterford, Pa.
Filed July 28, 1961, Ser. No. 127,626
9 Claims. (Cl. 152—233)

This invention relates to a novel antiskid chain and means for attaching the same on a vehicle wheel.

The primary object of the invention is the provision of a more practical and efficient assembly of the character indicated, which contemplates principally, but not exclusively, the detachable mounting of emergency cross chains on vehicle wheels, in a more secure and accurate manner, which avoids subjecting the rims or other parts of the wheels, and the chains, to marring and damage produced by friction and working of the chains relative to the wheels, in service, and in the application and removal of the chains, by the use of semi-permanently installed rings between the tires of the wheels, and the rim flanges at opposite sides of the wheel rims, and attaching the chains to the rings. The arrangement also eliminates the expense of undesirable mutilation of wheel rims, which results from providing the wheel rims or other parts of the wheels, with anchoring means for the chains.

Another object of the invention is the provision of an assembly of the character indicated above, wherein the attaching rings are formed with loops, and novel attaching elements are secured on the ends of the chains and passed through the loops to secure the chains in place, the attaching elements being spring-expanded and adapted to be passed through the loops in manually contracted condition, and wherein spring-tensioned connections of the ends of the chains with the attaching rings are produced, whereby the chain is maintained in constant contact with the tire of the wheel, despite changes in the contour and cross section of the tire in service.

A further object is the provision of more efficient and reliable attaching elements or catches of the character indicated above, which involves crossed and pivoted levers and improved positive stop means for limiting spread of the levers away from each other, by the spring means, beyond retaining engagement with the ring loops.

Other important objects and advantageous features of the invention will be apparent from the following description and the accompanying drawings, wherein, for purposes of illustration only, a specific form of the invention is set forth in detail.

In the drawing:

FIGURE 1 is a fragmentary side elevation of a vehicle wheel and associated tire, showing an antiskid chain assembly of the preshent invention installed thereon;

FIGURE 2 is a transverse section taken through FIGURE 1;

FIGURE 3 is an enlarged fragmentary vertical section taken on the line 3—3 of FIGURE 2;

FIGURE 4 is a longitudinal section taken on the line 4—4 of FIGURE 3; and,

FIGURE 5 is a bottom plan view of FIGURE 4, partly in section.

Referring in detail to the drawings, wherein like numerals designate like parts throughout the several views, the numeral 10 generally designates a vehicle wheel rim, on which a pneumatic tire 12 is mounted. The rim 10 has, as is usual, a channel or well 14 having coplanar flanges 16 projecting from opposite sides thereof, on which the tire beads 18 normally rest, the flanges 16 terminating, at their outer edges, in divergent radially outwardly extending retaining flanges 20, against which the outer sides of the tire beads normally bear.

In accordance with the present invention, special attaching rings 22, preferably of semi-rigid sheet metal, have angularly divergent horizontal and radial flanges 24 and 26, which are shaped and proportioned to engage and bear flatly upon the wheel rim flanges 16 and 20, respectively, and be retained thereagainst by the tire beads 18, when the tire 12, is installed on the attaching ring-equipped wheel rim 10 and inflated. In many cases, the attaching rings 22 can be installed on the wheel rim 10, with the tire 12 in a partially deflated condition.

The radial flanges 26 of the attaching rings 22 merge, at their outer edges, into narrow horizontal laterally outwardly extending flanges 28, which can bear upon the free edges 30 of the radial rim flanges 20, and the horizontal flanges 28 terminate in radial flanges 32, which are preferably disposed at right angles to the horizontal flanges 24 of the rings 22. The radial flanges 32, as indicated in FIGURE 2, are preferably relatively narrow, so that they are normally out of contact with the sidewalls of the tire 12. At equal circumferential distances therearound, the radial flanges 32 are provided with laterally outstanding flat loops 34 which are circumferentially elongated and have legs 36, fixed to the flanges 32, and cross members 38 parallel to and spaced from the outer surfaces of the flanges 32.

Attaching elements or catches 40, in accordance with the present invention, are secured to the ends of conventional or other antiskid cross chains 42, which extend across the tread and along the sidewalls of the tire 12. The catches 40 comprise elongated flat bodies 44, preferably solid, and of rectangular cross section and shape. The bodies 44 have flat and substantially unindented inward surfaces 46, adapted to bear slidably against the outer surfaces of the attaching ring flanges 32, when engaged through loops 34, as shown in FIGURE 2, with the outward surfaces 48 of the bodies bearing slidably against the loop cross members 38.

As shown in FIGURE 4, the outer surface 48 of the catch body 44 is cut away, from a midlength point, as far as the radially inward end 50 of the body, so as to define a flat inset surface 52. The outer surface 48 can be formed with a transverse groove 54 in which is suitably secured, flush with the surface 48, a transversely elongated stop bar 56, which extends beyond the opposite side edges of the body 44, at a location near to and spaced from the inset surfaces 52, for stop engagement with the legs 36 of a loop 34, as indicated in FIGURES 1 and 3. The shank of a stud 58 is centrally and longitudinally threaded into the outer end 60 of the body 44, as indicated at 61, and has an enlarged diameter head 62 on its outer end.

The stud shank has a smooth portion 64, and a transversely elongated slide 66 has a central bore 68 which receives the smooth portion 64, and has headed pivot pins 70 on its opposite ends. A U-shaped yoke 72 has a relatively short cross member 74 and elongated straight legs 76, which terminate in eyes 78 which are pivotally confined on the pins 70, with the stud head 62 spaced from the yoke cross member 74. An expanding coil spring 80 is circumposed on the stud shank and is compressed between the slide 66 and the yoke cross member 74, whereby the yoke 72, and the slide 66, are yieldably biased toward the outer end 66 of the catch body 44. Securement of end links of the cross chain 42 is made, as by clinching portions 82 thereof around the cross members 74 of the associated catches 40, as indicated in FIGURES 1 and 2.

Each of the catches 40 further comprises a pair of longitudinally elongated, similar, but reversed levers 84 and 86, where facing surfaces are formed with longitudinally elongated, interengaged grooves 88 and 90, respectively, which have opposite bevelled ends. The levers are both centrally traversed by a headed pivot pin 92 which is fixed to and extends laterally from an intermediate part of the inset surface 52 of the body 44. The levers have bevelled outer ends 94, which are angled inwardly relative to the axes of the levers, as shown in FIGURE 3, for stop engagements with the adjacent surfaces of the legs 36 of the loop 34.

The legs 84 and 86 are stopped in their spread condition by means of triangular stop lugs 96, outstanding on the inset surface 52, in line with and at opposite sides of the pivot pin 72, as shown in FIGURE 3, so that the lever ends 94 cannot be outwardly displaced from stop engagement with the loop legs 36.

The levers 84 and 86 are mutually tensioned to spread condition by means of a V-shaped spring 97 which is located at the inward side of the body 44, in a shallow recess 98 formed therein and opening to the inner end of the body 44. The spring 97 has crossed and divergent legs 100 which extend from a loop 102 which is securably circumposed on a headed pin 104 projecting from the bottom of the recess 98. The spring legs 100 terminate in lateral fingers 106, which extend outwardly through a transversely elongated closed slot 108, formed in the body 44, near its inner end, and bear against the inner sides of the levers 84 and 86, at their radially inward ends, as shown in FIGURES 3 and 4. The catches 40 can be removed from the loops 34, for disconnecting and removing the cross chain 42, by manually compressing the outer ends of the levers 84 and 86, toward each other, against the resistance of the spring 97, until their outer ends 95 can pass between the legs 36 of the loop 34. The inner ends of the levers and the inner end of the body 44 are rounded, as shown in FIGURE 3, so as to provide cam surfaces to bear against the inner surfaces of the loop legs 36, for facilitating and assisting rapid and easy insertion of the catches 40 through the loops 34, in installing a cross chain.

In operation, the expanding springs 96 of the catches 40 act, by yielding and contracting, to hold the cross chains 42 in contact with the tread of the tire 12, despite changes in the radial dimensions of and other distortion of the normal cross section of the tire, as a vehicle as driven over an uneven surface. The freedom of the slide 66 to pivot on the stud 58, relative to the catch body 44, provides additional freedom of the yokes 72 to follow distortions of the tire. Because of the bevelling of the outer ends 94 of the levers 84 and 86, the greater the radially outward pull exerted by the cross chain 42 on the catches, the more reliable and secure is the stop engagement of the levers with the loop legs 36, and this, in conjunction with the stop lugs 96, provides positive and secure retention of the catches 40 in the loops 34 under severe service conditions.

Although there has been shown and described herein a preferred form of the invention it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a vehicle wheel having a channel rim, a tire mounted on the rim and having beads engaged with the rim, attaching rings securably interposed between the tire beads and the rim, said rings having circumferentially spaced lateral loops thereon, a cross chain engaged across the tread and extending radially inwardly along the sidewalls of the tire, and chain tightening spring-tensioned catches secured to the ends of the cross chain and securably engaged through loops of the attaching rings, said loops having circumferentially spaced legs fixed to the attaching rings and circumferentially extending cross members, said catches having divergently spring-spread levers pivoted thereon, said levers having outer ends in stop engagements with the loop legs.

2. In combination, a vehicle wheel having a channel rim, a tire mounted on the rim and having beads engaged with the rim, attaching rings securably interposed between the tire beads and the rim, said rings having circumferentially spaced lateral loops thereon, a cross chain engaged across the tread and extending radially inwardly along the sidewalls of the tire, and chain tightening spring-tensioned catches secured to the ends of the cross chain and securably engaged through loops of the attaching rings, said loops having circumferentially spaced legs fixed to the attaching rings and circumferentially extending cross members, said catches having divergently spring-spread levers pivoted thereon, said levers having outer ends in stop engagements with the loop legs, said levers being in crossed and pivoted relationship, the outer ends of the levers having inwardly bevelled surfaces in cam engagements with the loop legs whereby pull of the cross chain serves to spread the levers and maintain said outer ends in stop engagements with the loop legs.

3. In combination, a vehicle wheel having a channel rim, a tire mounted on the rim and having beads engaged with the rim, attaching rings securably interposed between the tire beads and the rim, said rings having circumferentially spaced lateral loops thereon, a cross chain engaged across the tread and extending radially inwardly along the sidewalls of the tire, and chain tightening spring-tensioned catches secured to the ends of the cross chain and securably engaged through loops of the attaching rings, said loops having circumferentially spaced legs fixed to the attaching rings and circumferentially extending cross members, said catches having divergently spring-spread levers pivoted thereon, said levers having outer ends in stop engagements with the loop legs, said levers being in crossed and pivoted relationship, the outer ends of the levers having inwardly bevelled surfaces in cam engagements with the loop legs whereby pull of the cross chain serves to spread the levers and maintain said outer ends in stop engagements with the loop legs, and stops at opposite sides of the pivotal axis of the levers for limiting spread of the outer ends of the levers away from each other by pull of the cross chain.

4. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar.

5. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar, said lever means comprising crossed and vertically pivoted levers having loop entering ends and other ends, said other ends having cam surfaces thereon bearing against the legs of the loop and serving to spread the legs on exertion of a linear pull on the yoke, and stop lugs on the body at opposite sides of the pivotal axis of the levers for stopping spread of the other ends of the levers out of contact with the loop legs.

6. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar, said lever means comprising crossed and vertically pivoted levers having loop entering ends and other ends, said other ends having cam surfaces thereon bearing against the legs of the loop and serving to spread the legs on exertion of a linear pull on the yoke, and stop lugs on the body at opposite sides of the pivotal axis of the levers for stopping spread of the other ends of the levers out of contact with the loop legs, and spreading spring means mounted on the catch body and bearing against inner sides of the levers.

7. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar, said lever means comprising crossed and vertically pivoted levers having loop entering ends and other ends, said other ends having cam surfaces thereon bearing against the legs of the loop and serving to spread the legs on exertion of a linear pull on the yoke, and stop lugs on the body at opposite sides of the pivotal axis of the levers for stopping spread of the other ends of the levers out of contact with the loop legs, and spreading spring means mounted on the catch body and bearing against inner sides of the levers, said levers being located on one side of the catch body, said spring means being located on the opposite side of the body and having lateral fingers engaged with the inner sides of the levers.

8. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar, said lever means comprising crossed and vertically pivoted levers having loop entering ends and other ends, said other ends having cam surfaces thereon bearing against the legs of the loop and serving to spread the legs on exertion of a linear pull on the yoke, and stop lugs on the body at opposite sides of the pivotal axis of the levers for stopping spread of the other ends of the levers out of contact with the loop legs, and spreading spring means mounted on the catch body and bearing against inner sides of the levers, said levers being located on one side of the catch body, said spring means being located in the opposite side of the body and having lateral fingers engaged with the inner sides of the levers, said spring means having divergent legs terminating in said fingers, said body having a transverse closed slot at its entering end through which said fingers extend to engage the levers at the entering ends thereof.

9. A catch of the character described comprising a support having an outstanding loop thereon having legs and a cross member, an elongated body removably engaged endwise through said loop, said body having an entering end and another end, an axial stud fixed to and extending from said other end and having an enlarged head spaced from said other end, a slide on said stud having pivot pins on its ends at opposite sides of the body, a U-shaped yoke having a cross member and legs pivotally confined on the slide pins, a coil spring circumposed on the stud and compressed between its head and the slide, a stop bar fixed to said body and extending beyond opposite sides thereof and limiting insertion of the body in the loop, and spring-spread lever means on the catch body at the entering end thereof and bearing against the side of the loop remote from the stop bar, said lever means comprising crossed and vertically pivoted levers having loop entering ends and other ends, said other ends having cam surfaces thereon bearing against the legs of the loop and serving to spread the legs on exertion of a linear pull on the yoke, and stop lugs on the body at opposite sides of the pivotal axis of the levers for stopping spread of the other ends of the levers out of contact with the loop legs, and spreading spring means mounted on the catch body and bearing against inner sides of the levers, said levers being located on one side of the catch body, said spring means being located on the opposite side of the body and having lateral fingers engaged with the inner sides of the levers, said spring means having divergent legs terminating in said fingers, said body having a transverse closed slot at its entering end through which said fingers extend to engage the levers at the entering ends thereof, the entering ends of the levers and the entering of the catch body having cam surfaces adapted to bear against the inward surfaces of the loop legs as the catch is inserted through the loop.

References Cited in the file of this patent

UNITED STATES PATENTS

| | | |
|---|---|---|
| 1,405,672 | Davis | Feb. 7, 1922 |
| 2,204,886 | Devlin | June 18, 1940 |
| 2,514,243 | Iandiorio | July 4, 1950 |